United States Patent
Ryabov et al.

(10) Patent No.: US 11,935,539 B1
(45) Date of Patent: Mar. 19, 2024

(54) INTEGRATING VOICE CONTROLS INTO APPLICATIONS

(71) Applicant: Alan AI, Inc., Sunnyvale, CA (US)

(72) Inventors: Andrey Ryabov, Sunnyvale, CA (US); Anna Miroshnichenko, Chelyabinsk (RU); Evgeny Yusov, Moscow (RU); Alex Sotnikov, Voronezh (RU)

(73) Assignee: Alan AI, Inc., Sunnyvale, CA (US)

( * ) Notice: Subject to any disclaimer, the term of this patent is extended or adjusted under 35 U.S.C. 154(b) by 289 days.

(21) Appl. No.: 16/752,522

(22) Filed: Jan. 24, 2020

Related U.S. Application Data (60) Provisional application No. 62/799,645, filed on Jan. 31, 2019.

(51) Int. Cl.
*G10L 15/30* (2013.01)
*G10L 15/18* (2013.01)
*G10L 15/22* (2006.01)
*G10L 15/26* (2006.01)

(52) U.S. Cl.
CPC .......... *G10L 15/30* (2013.01); *G10L 15/1815* (2013.01); *G10L 15/22* (2013.01); *G10L 15/26* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 6,185,535 B1 * | 2/2001 | Hedin | G10L 15/30 704/E15.047 |
| 7,035,791 B2 * | 4/2006 | Chazan | G10L 13/07 704/207 |
| 9,043,213 B2 * | 5/2015 | Chun | G06F 40/58 704/277 |
| 9,691,411 B2 * | 6/2017 | Scherer | G10L 17/16 |
| 10,629,186 B1 * | 4/2020 | Slifka | G10L 15/1815 |
| 2007/0100618 A1 * | 5/2007 | Lee | G10L 15/1822 704/238 |
| 2008/0004880 A1 * | 1/2008 | Acero | G10L 15/22 704/E15.04 |

(Continued)

OTHER PUBLICATIONS

Cer, D. et al., "Universal Sentence Encoder," Google Research, Apr. 12, 2018, 7 pages.

*Primary Examiner* — Neeraj Sharma
(74) *Attorney, Agent, or Firm* — Greenberg Traurig, LLP

(57) ABSTRACT

A voice support server is used to provide voice control functionality to a third party application that does not natively support voice control functions. The voice support server implements a domain specific to the third party application that maintains a domain-specific language model (DLM) reflecting the functionality of the third party application. The DLM comprises a plurality of intent patterns corresponding to different commands and their possible variations that may be issued by the user, and maps each intent pattern to a corresponding action to be performed by the third party application. Received audio data is analyzed to determine one or more user utterances, which are transcribed and compared to the intent patterns of the DLM to identify an intent corresponding to the user utterance. The voice control module may then transmit instructions to the third party application to perform the action corresponding to the identified intent.

20 Claims, 6 Drawing Sheets

(56) References Cited

U.S. PATENT DOCUMENTS

| | | | |
|---|---|---|---|
| 2012/0053929 A1* | 3/2012 | Hsia | G16H 50/30 |
| | | | 704/9 |
| 2013/0346066 A1* | 12/2013 | Deoras | G06F 40/20 |
| | | | 704/E15.001 |
| 2015/0052084 A1* | 2/2015 | Kolluru | G06F 16/90335 |
| | | | 706/11 |
| 2016/0154792 A1* | 6/2016 | Sarikaya | G06F 40/35 |
| | | | 704/9 |
| 2017/0053646 A1* | 2/2017 | Watanabe | G06N 3/0445 |
| 2019/0295536 A1* | 9/2019 | Sapugay | G10L 15/19 |
| 2021/0225357 A1* | 7/2021 | Zhao | G10L 15/22 |

\* cited by examiner

FIG. 6

INTEGRATING VOICE CONTROLS INTO APPLICATIONS

CROSS-REFERENCE TO RELATED APPLICATIONS

The present disclosure claims priority to U.S. Provisional Patent Application No. 62/799,645, filed on Jan. 31, 2019, which is hereby incorporated by reference in its entirety.

BACKGROUND

This application relates to voice controlled applications, and more particularly to integration of voice controls into existing third-party applications.

Voice control may allow for a device or an application to controlled by a user by recognizing verbal commands spoken by the user and performing operations in response to the received commands. By removing the need to manually operate interface devices such as buttons, dials, or touchscreens, a user can operate the device or application in a hands-free manner, allowing them to make use of the application even when their hands are full or needed for other tasks. For example, a user may use an application with implemented voice control for various operations, such as executing a query or playing a media file, while driving a vehicle or otherwise performing some other task where their hands are occupied.

However, many existing applications having useful functions are currently not built with voice controls implemented. As such, a user wishing to use such an application may be restricted to controlling operation of the application manually.

SUMMARY

A voice support server is used to provide voice control functionality to a third party application that does not natively support voice control functions. The voice support server implements one or more domains. Each domain is specific to a particular third party application, and maintains a domain-specific language model (DLM) that reflects the functionality of the particular third party application. The DLM for a domain comprises a plurality of intent patterns that reflect different commands and their possible variations that may be issued by the user, and maps each intent pattern to a corresponding action to be performed by the third party application. In some embodiments, each intent pattern is expanded based upon its available variations and the possible entities corresponding to the intent that are accessible to the third party application. The expanded patterns are used to generate corresponding semantic representations that may be used to compare a level of semantic similarity between different pieces of text.

In some embodiments, a voice control module is installed as a plug-in on the third party application, and is configured to capture audio data corresponding to user voice commands, and transmit the captured audio data to the voice support server. The voice support server receives the audio data, extracts one or more user utterances from the audio data, and transcribes the user utterance. The transcribed utterance is transformed to form a semantic representation, which can be compared with those of the expanded patterns to identify an intent corresponding to the user utterance. The voice control module may then transmit instructions to the third party application to perform the action corresponding to the identified intent.

Some embodiments are directed to a method of providing voice control for an application. The method comprises receiving, via a wireless network, audio data associated with a user of an application executing on a remote client device. The method further comprises converting the received audio data into corresponding text, and generating an utterance vector indicating semantic features of the corresponding text. The method further comprises comparing the utterance vector to a plurality of intent vectors of a domain language model specific to the application to identify an intent vector matching the utterance vector, and transmitting instructions to the remote client device via the wireless network to cause the application to perform an action associated with the identified matching intent vector.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
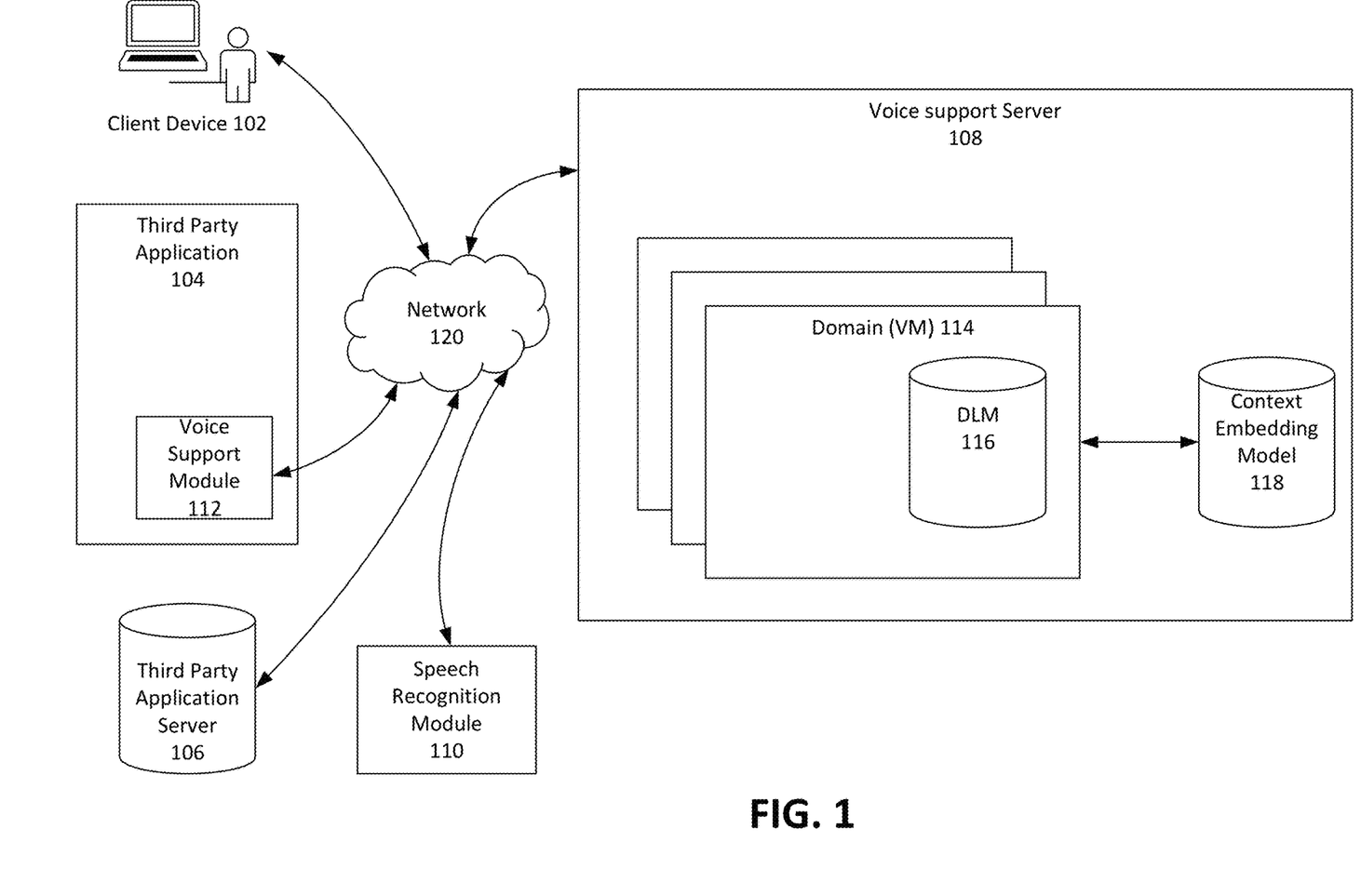
FIG. 1 illustrates a high level block diagram of a computing environment for implementing voice controls on existing applications, in accordance with some embodiments.

FIG. 1 illustrates a high level block diagram of a computing environment for implementing voice controls on existing applications, in accordance with some embodiments. FIG. 1 illustrates a client device 102, a third-party application 104, a third-party application server 106, a voice support server 108, and a speech recognition module 110, all of which may communicate with each other through a network 120.

The network 120 exchanges electronic data among the various entities listed above, and/or other entities, and may comprise any combination of local area and/or wide area networks, using both wired and/or wireless communication systems. In one embodiment, the network 120 comprises the Internet and uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 102 may correspond to any electronic device usable by a user to access and operate various applications (locally or over the network 120). For example, the client device 102 may be a smart phone, or a tablet, notebook, or desktop computer. The client device includes, and/or is coupled to, a speaker and/or display using which the user may consume audio-visual content (e.g., query results, media content, video chats, etc.). In addition, the client device 102 includes a user interface (UI), such as physical and/or on-screen buttons, which the user may interact with to perform various functions with the client device. The client device 102 further includes an audio receiver (e.g., a microphone) able to capture audio data, such as speech by the user of the client device 102.

The third party application 104 may correspond to any existing application that can be accessed by the user at the client device 102 and used by the user for performing one or more functions. For example, in some embodiments, the third party application 104 may, based upon one or more requests submitted by the user of the client device 102, display search results to the user, identify and play back a media file to the user, and the like. In some embodiments, the third party application 104 may correspond to a web page (viewed by the client device 102 through a browser application) or a mobile application. The third party application 104 may support interaction with the user of the client device 102 through one or more input mechanisms of the client device, such as mouse, keyboard, or touchscreen, but does not natively support or recognize voice commands.

In some embodiments, the user at the client device 102 accesses the third party application 104 over the network 120, as is illustrated in FIG. 1. In other embodiments, at least a portion of the third party application 104 may be stored and accessed locally on the client device 102. For example, the third party application 104 may comprise a client application installed on the client device 102 that is accessible to the user. The user may, using the client application, submit one or more requests, which may be used by the third party application 104 to perform various operations over the network 120, such as downloading a media file, connecting the user to a user at another client device, etc.

The third party application server 106 comprises at least one data store storing data utilized by the third party. For example, in some embodiments, the third party application server 106 may store content accessible to a third party application 104, which in turn is used to provide content to the user at the client device 102 utilizing the third party application 104.

The voice support server 108 is remote from the client device 102 and configured to implement voice control functions for the third party application. As discussed above, the third party application 104 does not natively support voice control functions. By implementing voice control functions for the third party application, a user can use the application while performing other tasks or when their hands are otherwise occupied (e.g., while operating a vehicle). For example, in an embodiment, the user may be an emergency responder, and can use the third party application to search for directions to desired locations, report status on certain tasks, etc. By implementing voice control functions for the third party application, the user can perform these functions while driving a vehicle or concurrently performing other tasks, potentially increasing efficiency.

In some embodiments, the voice support server 108 interfaces with the third party application 108 through a voice support module 112 executing in association with the third party application 104. The voice support module 112 is distinct from the application 104 and may correspond to a plug-in installed on the third party application 104. The voice support module 112 can capture certain inputs to the client device 102 and/or received by the third party application 104. The voice support module 112 can also control one or more operations of the third party application 104. In some embodiments where the third party application 104 is a web page, the voice support module 112 may comprise JavaScript code that causes the plug-in to be downloaded to, and executed by, the client device 102 along with the web page. In some embodiments, where the third party application 104 corresponds to a mobile application, the voice support module 112 is integrated into the application. In some embodiments, a voice support module 112 is added to the third party application 104 by a developer of the third party application 104.

In some embodiments, the third party application 104 having an installed voice support module 112 may display at the client device 102 a user interface corresponding to the third party application 104 that includes an interactive interface element (e.g., a button, icon, or the like) corresponding to the voice support module 112. The user of the client device 102 may activate the interactive interface element in order to turn on functionality of the voice support module 112, enabling the user to make use of the voice support functions provided by the voice support module 112. For example, when the user of the client device 102 activates the interactive interface element (e.g., by touching the interactive interface element on a touchscreen), the voice support module 112 may instruct an audio receiver of the client device 102 to record audio data.

The voice support module 112 captures audio data comprising at least one voice command from the user of the client device 102 (e.g., via a microphone of the client device 102), and sends the captured audio data to the voice support server 108. The voice support server 108 analyzes the received audio data, extracts the at least one voice command, and determines an action corresponding to the voice command. The voice support server 108 transmits to the voice support module 112 instructions indicating the corresponding action to be performed, whereupon the voice support module 112 interfaces with the third party application 104 to perform the identified action. For example, the voice support module 112 may access an API natively provided by the third party application 104 in order to instruct the third party application 104 to perform the identified action. In some embodiments, the voice support module 112 translates the instructions received from the voice support server 108 into a format compatible with the API of the third party application 104. As such, the user is able to control operations of the third party application 104 using voice commands, despite the third party application 104 not implementing voice control functionality natively.

Different third party applications 104 may have different types of functionality. As such, the types of voice commands a user may desire to perform on a first third party application 104 may be different from those of a second, different third party application. In order to accurately handle voice commands for each of a plurality of different applications, the voice support server maintains, for each different third party application 104, a domain 114 corresponding to the third party application 104. Each domain may be implemented as a virtual machine (VM).

Each domain 114 maintains a domain language model (DLM) 116 that is specific to the particular third party application 104 corresponding to the domain 114. The DLM 116 is a model that reflects the specific types of commands that are associated with the third party application. Because different third party application 104 may be capable of performing different types of actions, each DLM 116 is customized for its specific domain 114. In some embodiments, a developer associated with the third party application 104 may define the DLM 116 for the third party application 104 by defining the types of commands that can be processed by the third party application 104. As such, the scope of the language that received voice commands can be matched to is restricted to a particular domain, allowing for improved recognition in comparison to general speech recognition. For example, when the user speaks a voice command, possible actions that the audio data corresponding to the voice commands can be matched to is limited to that of the particular third party application 104. This may allow for the voice support module 108 to better handle variations in speech (e.g., due to accents or speech impediments).

The DLM 116 may comprise a plurality of patterns corresponding to different variations of user intents that can be used to perform actions on the third party application 104, which reflect the natural variations that may be used by human users to convey the same intent. For example, a user wishing to perform a query using the third party application 104, such as finding records from a certain date, may say "find records from $date", "search from records on $date", "retrieve all records from $date", and/or other variations, where $date is a variable that may correspond to a particular date spoken by the user. As used herein, an "intent" may refer to a type of command that may be spoken by the user of the third party application 104 that corresponds to a particular type of action that can be performed by the third party application 104. In some embodiments, the developer for the third party application 104 defines patterns corresponding to intents (e.g., hereinafter also referred to as "intent patterns") that correspond to actions able to be performed by the third party application 104. In addition, the DLM 116 comprises action data associated with each of the plurality of patterns describing the corresponding action to the intent pattern. The action data may comprise instructions that may be transmitted from the voice support server 108 to the third party application 104 (e.g., via the voice support module 112) to cause the third party application 104 to perform the action corresponding to the pattern.

In some embodiments, one or more of the intents may further be associated with a context. For example, in some third party applications, certain actions can only be performed when the third party application 104 has a certain context (e.g., the user has accessed a particular page of the third party application 104). As such, the context associated with the intent indicates under which contexts of the third party application 104 that actions associated with the intent can be performed.

Each domain 114 is able to receive audio data corresponding to voice commands spoken by the user at the client device 102 to the third party application 104 (e.g., as captured via an audio device of the client device 102) through the voice support module 112. The domain 114 may process the received audio data to identify individual commands from the user, hereinafter referred to as "user utterances", and transcribe the identified user utterances such that they can be matched with intent patterns defined in the DLM 116. In some embodiments, the transcription of audio data corresponding to the identified user utterances is performed by a speech recognition module 110. The speech recognition module 110 may correspond a commercially-available speech to text transcription service, such as Google Cloud Speech-to-Text. In other embodiments, the speech recognition module 110 may be implemented by the voice support server 108.

In some embodiments, in order to match a transcribed user utterance to an intent of the DLM 116, the domain 114 uses a context embedding model 118 to compare the transcribed user utterance with a plurality of intent patterns of the DLM 116. The context embedding model 118 is configured to receive textual data, and convert the textual data into a semantic representation (e.g., a semantic vector) usable for determining a level of semantic similarity between different pieces of text. By comparing the transcribed user utterances to the intent patterns of the DLM 116 based upon semantic similarity instead of direct textual similarity, the transcribed user utterance can be more accurately and efficiently matched to an intent pattern, even if the intent patterns of the DLM 116 do not cover all semantic variations of a given intent. In some embodiments, the voice support server 108 maintains the context embedding model 118 to be generally applicable across multiple domains, allowing for the same context embedding model 118 to be shared by a plurality of domains 114.

Figure 2:
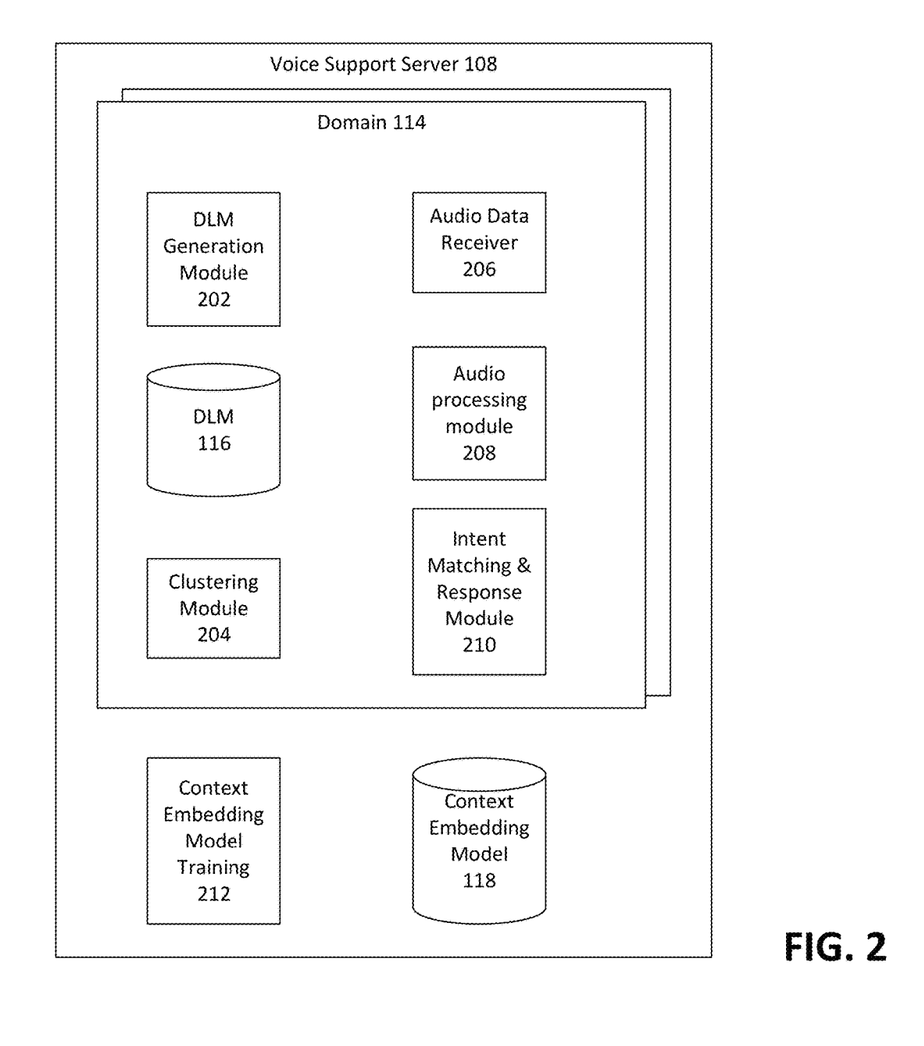
FIG. 2 illustrates a high level block diagram of the voice support server, in accordance with some embodiments.

FIG. 2 illustrates a high level block diagram of the voice support server 108, in accordance with some embodiments. As discussed above in relation to FIG. 1, the voice support server 108 may maintain at least one domain 114. Each domain 114 may correspond to one or more particular third party applications (e.g., third party application 104).

A particular domain 114 may comprises a DLM generation module 202, a generated DLM 116, a clustering module 204, an audio data receiver 206, an audio processing module 208, and an intent matching/response module 210. The voice support server 108 may further maintain one or more components outside the domain 114, which may be accessible by multiple domains 114. These include a context embedding model training module 212 and a context embedding model 118.

The DLM generation module 202 generates the DLM 116 for the domain 114, so that received user utterances can be mapped to intents corresponding to actions to be performed by the third party application 104. In some embodiments, the DLM generation module 202 receives a plurality of intent patterns. Each intent pattern describes an intent and an action to be performed corresponding to the intent. In addition, an intent pattern may also specify a type of entity that can be acted on by the intent. For example, a voice command "directions to the airport" may be recognized by an intent pattern as having an intent corresponding to "directions," and an entity corresponding to a location ("the airport"). As a result, the intent pattern may correspond to an action to cause the third party application 104 to query and display to the user directions to a desired location (e.g., the airport). In some embodiments, the patterns are written using JavaScript code, XML code, etc.

In some embodiments, the intent patterns are submitted to the DLM generation module 202 by a developer of the third party application 104, based upon the particular actions that can be performed by the third party application 104. For example, different intent patterns may correspond to intents to query for certain search terms, access particular folders or files, play back a media file, etc.

An intent pattern may comprise one or more variables representing a class of named entities. In some embodiments, a variable may be marked with a particular character (e.g., "&"). For example, a pattern may correspond to "directions to &location" or "play &song", where &location and &song are variables that represent particular classes of entities (e.g., locations and songs, respectively) that serve as the subject of the intent. The developer may define, as part of the DLM 116, how each variable maps to a class of entities accessible to the third party application 104, and may define instructions on how to retrieve entities of the class from the third party application server 106.

In some embodiments, an entity may correspond to an object having one or more attributes, and is marked within a pattern by a particular character (e.g., "$"). For example, the entity $hotel_california may be a song (e.g., belonging to the class of entities corresponding to &song), having attributes comprising at least a name (e.g., "Hotel California") and a reference to audio data corresponding to the song that is maintained by the third party application 104 (e.g., stored in the third party application server 106). In some embodiments, an entity may correspond to a search term, and as such may not directly correspond to an object maintained by the third party application 104. In some embodiments, an entity may correspond to an object assessable by the third party application 104 but not directly managed by the third party application 104 (e.g., content hosted by a different application but that is accessible to the third party application 104).

In some embodiments, a pattern may reflect multiple ways for expressing a particular intent. For example, if a user wishes to use the third party application 104 to play an audio file (e.g., a song), this intent may be expressed by a command to "play" the audio file or to "listen to" the audio file. In addition, an intent pattern may include words before or after the entity. For example, using the above example of playing an audio file, the user may express the intent with the command "play $song song" or "play $song track", where $song corresponds to language indicating the particular audio file to be played (e.g., a title of the audio file). The pattern may thus be defined to account for these different options for expressing the intent.

In some embodiments, a pattern may contain more than one entity. For example, a particular pattern may specify a first entity corresponding to a query term, and a second entity correspond to a filter condition for the query term (e.g., "search for $query_term that $filter_term").

The DLM generation module 202 generates the DLM 116 using the received patterns. In some embodiments, the DLM generation module 202 expands each pattern to form the DLM 116. Expanding a pattern may comprise separating each pattern into each of its possible variations. In addition, where a pattern comprises a variable corresponding to a class of entities (e.g., &song or &location, as discussed above), the DLM generation module 202 may expand the pattern by accessing the third party application server 106 of the third party application 104 to retrieve data indicating possible entities that correspond to the class of entities indicated by the variable, such as a list of songs that can be played by the third party application 104, list of locations that can be searched for, etc. In some embodiments, the DLM generation module 202 uses an API of the third party application server 106 to retrieve the data indicating the entities corresponding to the variable. In some embodiments, the DLM generation module 202 further retrieves information from the third party application server 106 needed by the voice support server 108 to cause the third party application 104 to perform an action corresponding to the entity (e.g., cause the third party application 104 to play a requested song, search for a requested location, etc.).

The DLM generation module 202 uses the retrieved data indicating possible entities of the class indicated by a variable within a pattern to expand the pattern. For example, for a pattern corresponding to "(Play|Listen To) &song (" "|track)" and the retrieved data indicates that the possible song entities are "$wonderwall" and "$hotel-california," the pattern may be expanded into a set of expanded patterns comprising "play $wonderwall", "listen to $wonderwall," "play $wonderwall track," "listen to $wonderwall track", "play $hotel-california,", "play $hotel-california track," "listen to $hotel-california," and "listen to $hotel-california track.". As such, the expanded set of patterns will cover all combinations of phrasing variations and individual entities of the class of entities indicated in the original un-expanded pattern 302. The DLM 116 may comprise the entire corpus of expanded patterns defined by the DLM generation module 202. In some embodiments, the entities within each pattern (e.g., $wonderwall) are replaced with corresponding text strings (e.g., "Wonderwall"), corresponding to how the entity would be verbalized by the user. For example, the entity $wonderwall may refer to an object corresponding to a song and having the title "Wonderwall." In some embodiments, additional variations of how the entity may be verbalized (e.g., "Wonderwall by Oasis") may also be used to generate additional expanded patterns. In some embodiments, where an entity corresponds to a search term and not to an entity accessible to third party application 104, the expanded patterns may comprise an indication of the presence of the search term (e.g., a placeholder), instead of specific text corresponding to an expected user verbalization.

Each expanded pattern is associated with a corresponding action to be performed by the third party application 104. How the different actions map to intent patterns may be specified by a developer of the third party application 104 when defining the intent patterns. In some embodiments, a pattern is associated with a set of instructions that can be transmitted from the voice support server 108 to the third party application 104, in order to cause the third party application 104 to perform the corresponding action at the client device 102. When an intent pattern is expanded, the action associated with the intent pattern is expanded such that each expanded pattern is associated with an action that references the resolved variable (e.g., the specific $song entity) of the expanded pattern. For example, the pattern "(Play|Listen To) &song (" "|track)" referred to above may be associated with an action to cause the third party application to retrieve and play an audio file corresponding to the entity indicated by &song. The expanded patterns of the pattern include "play $wonderwall", which is associated with the action to retrieve and play the audio file corresponding to $wonderwall, while "listen to $hotel-california" is associated with the action to retrieve and play the audio file corresponding to $hotel-california.

In order to effectively match transcriptions of received user utterances with intents corresponding to the patterns of the DLM 116, each expanded pattern of the DLM 116 may be converted into a semantic representation, such as a semantic vector. In some embodiments, the DLM generation module 202 may transmit each of the expanded patterns to the context embedding model 118, which converts the received patterns into corresponding semantic vectors.

The context embedding model 118 is a neural network model generated and trained using the context embedding model training module 212. The context embedding model training module 212 may receive a known corpus of textual data (e.g., sentences) and train the neural network to map textual data to semantic vectors using the known corpus. Each semantic vector comprises one or more contextual embeddings, which indicate semantic features of the sentence corresponding to the semantic vector. In some embodiments, the context embedding model 118 converts received text to vectors using a word2vec algorithm.

As discussed above, the context embedding model 118 may have general applicability and is shared by multiple domains 114. In other embodiments, different context embedding models 118 may be trained on more specialized corpuses of data (e.g., language relating to a particular field), such that the resulting models are more specialized for particular types of third party applications.

In addition, in some embodiments, different context embedding models 118 may be used that produce semantic vectors having different degrees of precision. For example, the context embedding model 118 may include a first model that maps received text to a first type of semantic vector, and a second model that maps received text to a second type of semantic vector, wherein the second type of semantic vector is more precise than the first type of semantic vector (e.g., contains a larger number of dimensions reflecting a larger number of embeddings). However, it may be more expensive (e.g., require a greater amount of computation) to determine a level of similarity between vectors of the second type in comparison to vectors of the first type. In some embodiments, clustering of the expanded intent patterns of the DLM 116 is performed using the first type of semantic vector.

By converting the expanding patterns of the DLM 116 corresponding to different intents into vectors, the patterns can be more easily compared to vectors corresponding to the received user utterances. Because the comparison will be based upon semantic and contextual similarity, and not just textual similarity, a user utterance may be able to be matched with an intent pattern, even if the user utterance does not exactly match the pattern (e.g., contains different words with similar meanings, extra words, etc.). In some embodiments, two vectors corresponding to an intent pattern and a user utterance may be compared by calculating a distance between the vectors, wherein a smaller distance indicates that the pattern and the utterance are more semantically similar in comparison to a larger distance. In some embodiments, the calculated distances may be Euclidean distances. In other embodiments, different vectors may be compared using cosine similarity.

The clustering module 204 is configured to receive the vectors corresponding to each of the patterns of the DLM 116, and to cluster the received vectors into a plurality of clusters based upon a level of similarity between the vectors. For example, the vectors may be clustered such that vectors having at least a threshold amount of similarity to each other are placed within the same cluster. Similarity between vectors may be measured based upon the distance between the vectors. By clustering the vectors corresponding to the patterns of the DLM 116, received vectors corresponding to user utterances can be more easily matched with the vectors of the DLM 116. For example, a received user utterance vector may be first matched with a cluster that is closest to the received vectors, whereupon a closest vector of the identified cluster can then be found. This may potentially reduce an amount of processing needed to match the user utterance to an intent, as a smaller number of vectors of the DLM 116 will need to be evaluated. In some embodiments, the clustering module 204 clusters the vectors using K-means clustering.

Once the domain 114 has generated the DLM 116, generated vectors corresponding to the patterns of the DLM 116, and (optionally) clustered the resulting vectors, the domain 114 will be equipped to begin receiving audio data corresponding to commands from the user to the third party application 104.

The audio data receiver 206 is configured to receive audio data that may contain one or more voice commands from a user. In some embodiments, the audio data receiver 206 receives the audio data over the network 120 from the voice support module 112 installed on the third party application 104. The voice support module 112 captures audio data received through a microphone or other audio device of the client device 102, and transmits the captured audio data to the voice support server 108, where it is received by the audio data receiver 206 of the domain 114 corresponding to the third party application 104. The captured audio data may comprise at least one statement spoken by the user. In some embodiments, the audio data receiver 206 also receives additional metadata, such as context information indicating a context or state of the third party application 104 when the audio data is received. For example, where the third party application 104 has multiple pages or interfaces that can be navigated between by the user, the context information may indicate which page or interface of the application the user is viewing at the time the audio data is received.

The audio processing module 208 is configured to identify voice data within the received audio data, and to transcribe the identified voice data. In some embodiments, the audio processing module 208 analyzes the audio data (e.g., audio data 306) and performs voice recognition to determine if any of the audio data corresponds to words spoken by a human user. This may be done to eliminate audio data that might have been captured by accident (e.g., due to the user's microphone recording audio data corresponding to background noise, instead of speech by the user). In some embodiments, the audio processing module 208 may also recognize an identity of the user through voice recognition. In some embodiments, by determining an identity of the user, the audio data may be able to be more accurately transcribed (e.g., through use of a transcription model tailored to particular users or particular types of users).

The audio processing module 208 further analyzes the portion of the audio data corresponding to verbal speech, and divides the portion of the audio data into one or more user utterances corresponding to individual sentences or commands within the analyzed audio data. Typically, when a user issues one or more voice commands, each voice command may be in the form of a separate sentence. Thus, by identifying individual sentences within the received audio data, the audio processing module 208 may be able to separate portions of the audio data into user utterances corresponding to different commands, allowing for each command to be processed individually. In some embodiments, the audio processing module 208 separates the audio data into different sentences by recognizing pauses within the audio data as divisions between sentences.

The audio processing module 208 further transcribes each of the determined user utterances, converting the audio data corresponding to each segment to text. In some embodiments, the audio processing module 208 transcribes each sentence by transmitting the user utterances to a separate speech recognition module (e.g., the speech recognition module 110 illustrated in FIG. 1). The speech recognition module 110 may be maintained by a third party. For example, the speech recognition module may correspond to Google Cloud Speech-to-Text service. The speech recognition module analyzes the received user utterance data, and generates at least one textual transcription of the user utterances.

In some embodiments, the audio processing module 208 (e.g., using the speech recognition module 110) may generate a plurality of transcriptions for each user utterance. Each transcription corresponds to a different possible interpretation of the user utterance, and may be associated with a confidence value indicating the likelihood that the interpretation is correct. In some embodiments, each of the candidate transcriptions may be processed (e.g., used to perform intent matching). In other embodiments, the transcription having the highest confidence value is used, while other candidate transcriptions are discarded.

The intent matching & response module 210 receives the user utterance transcriptions, and matches the transcriptions to at least one intent pattern of the DLM 116. For example, the intent matching & response module 210 may submit the user utterance transcriptions to the context embedding model 118, which returns vectors corresponding to each utterance transcription. The vectors are then matched with vectors corresponding to intents of the DLM 116, whereupon an intent vector that is closest to an utterance vector is selected.

In some embodiments, for each utterance vector, a cluster of intent vectors closest to the utterance vector is identified (e.g., based upon a distance between the utterance vector and a centroid of the cluster). An intent vector of the cluster that is closest to the utterance vector can then be determined and designated as a matching intent vector for the user utterance. In embodiments where the context embedding model 118 comprises first and second models for generating first and second types of vectors (as discussed above), a user utterance transcription may first be processed by the first model to generate an utterance vector of the first type, which is used to determine a closest matching cluster. The user utterance transcription may then be processed using the second model to generate an utterance vector of the second type, which may be compared with the individual vectors of the second type corresponding to the expanded intent patterns of the identified cluster. Because the second type of vector is more precise than the first type of vector, this may allow for a more accurate match to be determined, while reducing an amount of comparisons that need to be performed using the second type pf vector.

In embodiments where the audio processing module 208 returns multiple possible transcriptions corresponding to a particular utterance, the intent matching & response module 210 may determine a vector corresponding to each transcription, and compare each of the vectors to those of the intent patterns of the DLM 116. In some embodiments, the intent matching & response module 210 identifies the intent vector that is closest to any of the vectorized utterance transcriptions as the intent corresponding to the utterance. For example, the intent matching & response module 210 may determine that the distance between the vector for candidate transcription "Play 'Wonderwall'" to its closest intent vector (e.g., corresponding to the expanded intent pattern "Play 'Wonderwall'") is less than that of the distances between the remaining candidate transcriptions and their respective closest intent vectors. As such, the candidate transcription "Play 'Wonderwall'" and the expanded intent pattern "Play 'Wonderwall'" may be determined to reflect the user's true intent. In some embodiments, the intent corresponding to the utterance may be determined based upon a function between distance to the vector of the closest utterance transcription and a confidence value associated with the closest utterance transcription. In embodiments where the intent vector corresponds to a pattern having a placeholder corresponding to a search term, the intent matching & response module 210 may further determine the search term using the matched transcription.

The intent matching & response module 210, upon identifying an intent vector closest to the user utterance, identifies the action to be performed by the third party application 104 associated with the identified intent. The intent matching & response module 210 transmits to the third party application 104 (e.g., through the voice support module 112 installed on the third party application 104) instructions for performing the determined action. The instructions comprise an indication of the type of action to be performed (e.g., a query search, playback of a media file, etc.) and one or more entities the action is to be performed on (e.g., a query term, a filter condition, a title of the file to be retrieved or played back, etc.).

In some embodiments, one or more aspects of the action to be performed by the third party application 104 may be based upon the wording of the user utterance. As discussed above, the intent corresponding to the action may have a number of variations, corresponding to different ways the user may be able to verbalize the intent. For example, the user may be able to say "query", "search for", "retrieve", and or other variations in order to convey an intent to query for a search term. In some embodiments, when the third party application 104 performs an action, the third party application 104 may display an indication of the action that is being performed, such as textual indication (e.g., "now searching . . . " text indicating that the action is being performed), an audio indication, and/or the like. The language of the indication may mirror that used by the user. As such, if the user used the language "search for . . . ," the displayed indication may read "now searching for . . . " On the other hand, if the user used the language "retrieve," the displayed indication may read "now retrieving . . . " The instructions transmitted by the intent matching & response module 210 to the third party application 104 contains at least a portion of the language of the transcription of the user utterance, allowing the third party application 104 is generate an indication that mirrors the wording used in the utterance.

In some embodiments, the available intents and actions that a user utterance can be matched with may be based upon a current context of the third party application 104. For example, in some embodiments, a user may access different contexts within the third party application 104 (e.g., navigate between pages corresponding to directories and subdirectories, different UIs for performing different functions), each of which may be associated with particular actions or link to other contexts of the application. In addition, in some embodiments, a particular context of the third party application 104 may limit the entities an action may be performed on.

The user may give voice commands to the third party application 104 to perform actions, where the actions able to be performed are limited by the current context of the third party application 104. As such, when matching a vector of a user utterance, the intent matching & response module 210 may determine a current context of the third party application 104 (e.g., based on metadata received in conjunction with the audio data associated with the user utterance), and restricts the corpus of intent vectors of the DLM 116 that the utterance vector is compared against to a subset of intent vectors associated with the current context. For example, a particular context may be associated with only a subset of intent patterns corresponding to different types of actions that can be performed. In some embodiments, the corpus of entities that can be subject to an available action may be restricted based upon a current context of the application (e.g., the list of audio files that may be the subject of a "play audio" intent may be restricted to a subset of audio files corresponding to the current context, instead of all audio files able to be played using the application). By limiting the corpus of patterns that the user utterance can be matched against based on the current context of the application, a more accurate match may be able to be achieved.

Figure 3:
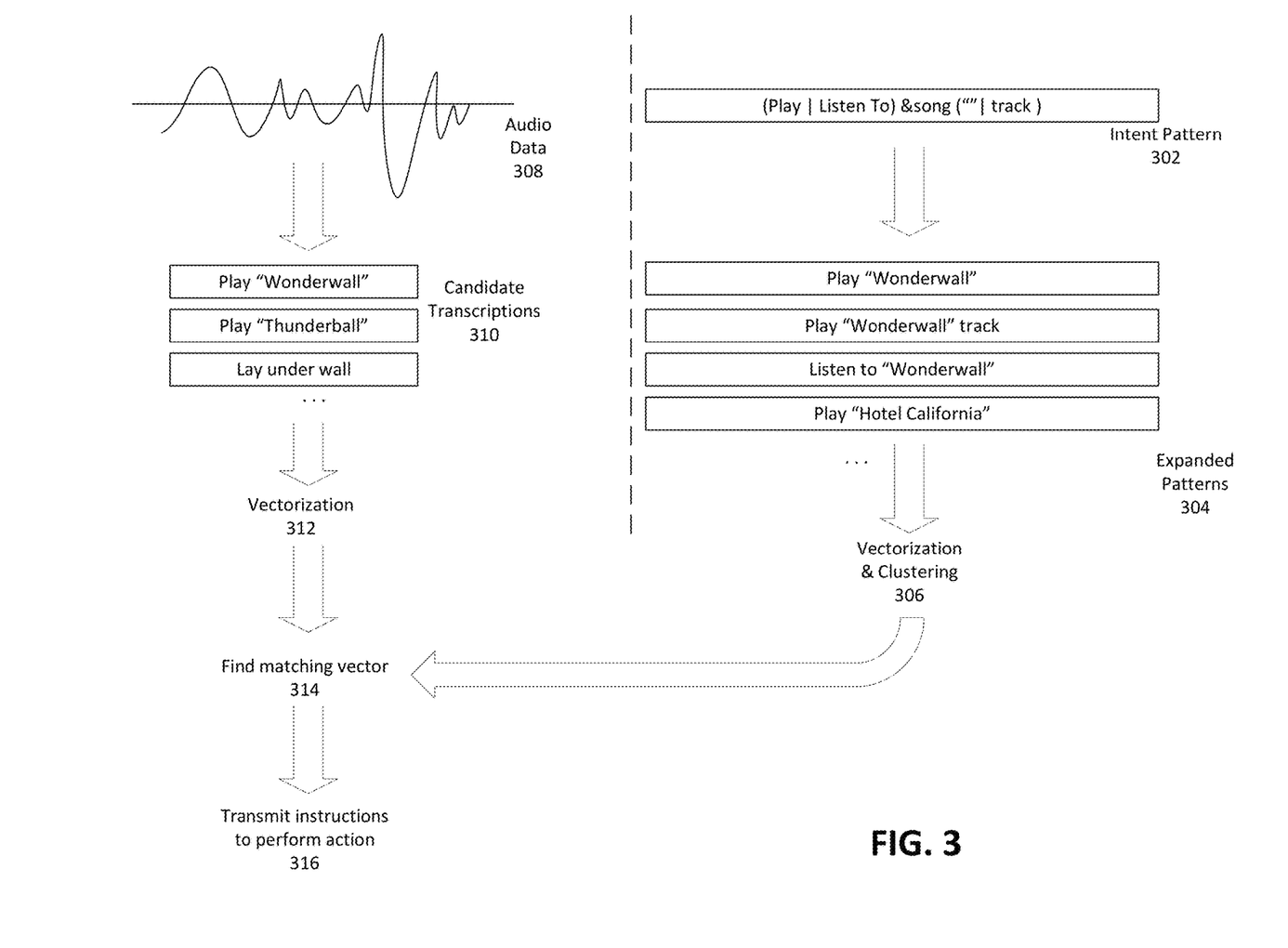
FIG. 3 illustrates an example process of implementing voice support for an application, in accordance with some embodiments.

FIG. 3 illustrates an example process of implementing voice support for an application, in accordance with some embodiments. The process illustrated in FIG. 3 may be implemented in whole or in part using the voice support server 108 illustrated in FIG. 1, such as by a particular domain 114 corresponding a particular third party application 104.

In order to configure a DLM for the domain 114 corresponding to the third party application 104, a user (e.g., a developer of the third party application 104) defines one or more intent patterns. Each intent pattern may reflect one or more variations corresponding to how a user of the third party application may be expected to verbalize the intent corresponding to the intent pattern. For example, FIG. 3 illustrates an intent pattern 302 expressed as "(Play|Listen To) &song (" "|track)", indicating multiple variations corresponding to possible user utterances that may match with the intent of the pattern. The intent pattern 302 may include at least one variable (e.g., &song) indicating a class of entities that may be the subject of the intent pattern (e.g., $song entities).

Each intent pattern is associated with an action to be performed by the third party application 104. The associated action may be performed on a specified entity of the class indicated by a variable within the intent pattern 302 (e.g., &song). For example the intent pattern 302 may be associated with a set of instructions for accessing the third party application 104 and causing the third party application 104 to play back an audio file (e.g., a particular $song entity of the &song class).

The defined intent pattern 302 is expanded to form a set of one or more expanded patterns 304. Each of the expanded patterns 304 corresponds to a particular combination of one or more variations indicated by the intent pattern 302. In addition, the expanded patterns 304 may correspond to particular entities of the class of entities indicated by variables within the intent pattern 302 (e.g., based upon data retrieved from the third party application server 106). For example, for the pattern 302 illustrated in FIG. 3 ("(Play|Listen To) &song (" "|track)"), if the corpus of song entities comprises "$wonderwall" and "$hotel-california," the pattern may be expanded into a set of expanded patterns 304 comprising "play $wonderwall", "listen to $wonderwall," "play $wonderwall track," and "play $hotel-california," as well as "listen to $wonderwall track", "play $hotel-california track," "listen to $hotel-california," and "listen to $hotel-california track" (not shown in FIG. 3). As such, the set of expanded patterns 304 may correspond to each distinct combination of variations and entities indicated by the intent pattern 302. The set of expanded patterns 304 corresponding to the corpus of defined intent patterns 302 forms the DLM for the domain.

Next, the expanded patterns 304 undergo a vectorization and clustering 306 process. Vectorization and clustering 306 comprises using the context embedding model 118 to generate, for each of the expanded patterns 304, an intent vector representing the semantic features of the expanded pattern 304. The generated intent vectors are then clustered (e.g., using the clustering module 204) into one or more clusters based upon a level of similarity between the vectors (e.g., based upon distance between the vectors), in order to facilitate matching with utterance vectors.

When a user uses the third party application 104, the voice support module 112 installed on the third party application 104 may be used to capture audio data from the user. For example, the audio data 308 illustrated in FIG. 3 may comprise at least one statement spoken by the user. In some embodiments, the audio data receiver 206 may further receive additional information (e.g., metadata), such as context information corresponding to a context of the third party application 104 when the audio data 308 as received.

The audio data 308 is processed to generate at least one transcription corresponding to at least a portion of the audio data 308. For example, the audio data 308 may be analyzed to identify a user utterance, from which one or more candidate transcriptions 310 can be determined. Each of the candidate transcriptions 310 may include wording that is similar in terms of audio, but not necessarily in semantic meaning. For example, as illustrated in FIG. 3, the candidate transcriptions "Play 'Wonderwall'" and "Lay under wall" may sound similar from an auditory standpoint, but are semantically unrelated. In some embodiments, each candidate transcription 310 is associated with a confidence value.

The candidate transcriptions 310 undergo vectorization 312, in which one or more of the candidate transcriptions 310 are processed using the context embedding model 118 to generate a corresponding utterance vector representing one or more semantic features of the transcription. In some embodiments, vectorization 312 is performed on all of the candidate transcriptions 310. In other embodiments, vectorization 312 is performed on only a portion of the candidate transcriptions 310 (e.g., transcriptions associated with at least a threshold confidence value).

Vector matching 314 is performed between the utterance vectors corresponding to the candidate transcriptions 310 and the intent vectors of the DLM of the domain, in order to identify an expanded pattern 304 that is the best semantic match for a transcription of the candidate transcriptions 310. In some embodiments, the body of intent vectors compared against the utterance vectors may be limited based upon a context of the third party application associated with the utterance vectors.

In some embodiments, each utterance vector is matched with a cluster of intent vectors that is closest to the utterance vector. An intent vector of the identified cluster that is closest to the utterance vector is then selected as the best semantic match for the utterance vector. In some embodiments, the expanded pattern 304 is selected as a pattern corresponding to the intent vector closest to any of the utterance vectors corresponding to the candidate transcriptions 310. For instance, in the example illustrated in FIG. 3, the intent vector corresponding to the expanded pattern "Play 'Wonderwall'" may be matched with the utterance vector of the candidate transcription "Play 'Wonderwall'" as the most semantically similar intent vector. As such, the expanded pattern "Play 'Wonderwall'" may be selected as corresponding to the intent of the received user utterance.

Responsive to a particular expanded pattern 304 being determined as a best semantic match, the action associated with the expanded pattern 304 is identified (e.g., to play back an audio file corresponding to the entity "Wonderwall" indicated by the expanded pattern). The voice support server transmits instructions 316 to the third party application 104 (e.g., via the voice support module 112) to perform the action associated with the identified expanded pattern 304.

Process Flow

Figure 4:
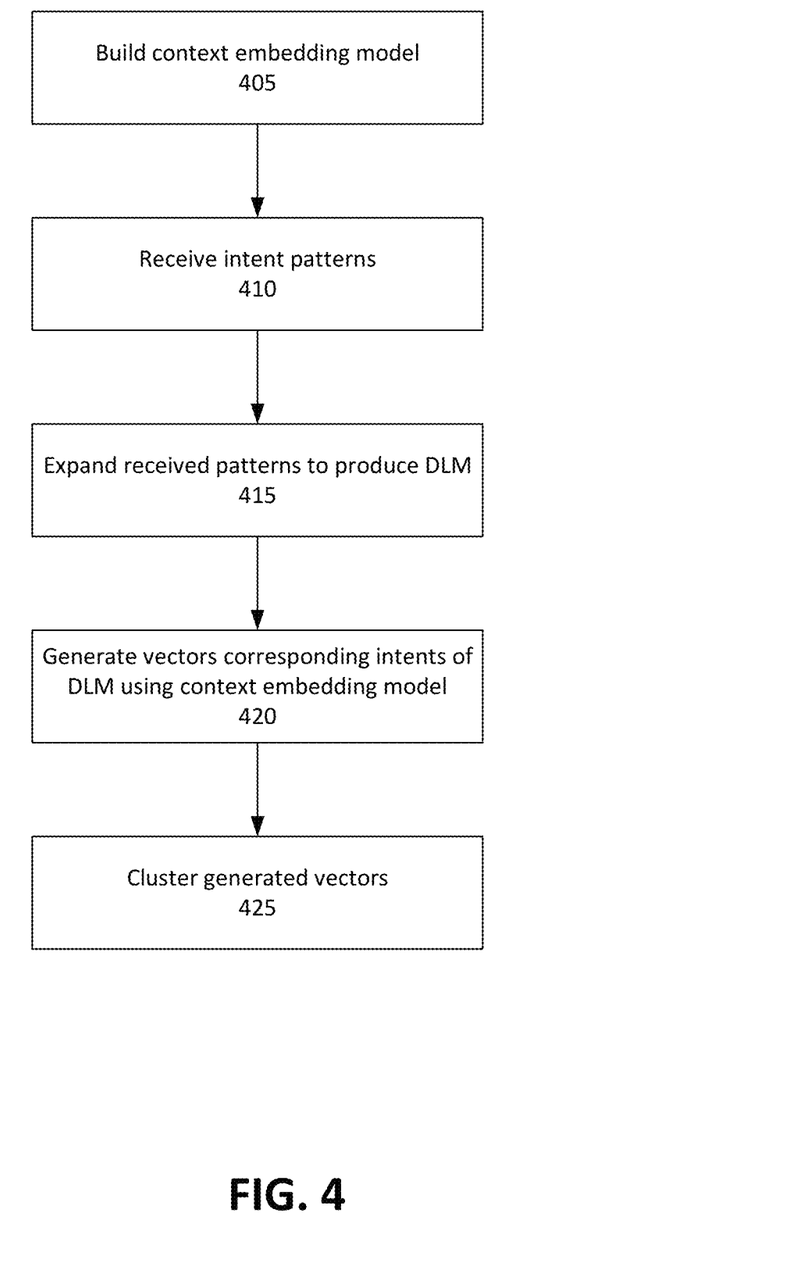
FIG. 4 is a flowchart of a process for establishing a DLM for a domain for implementing voice controls for a third party application, in accordance with some embodiments.

FIG. 4 is a flowchart of a process for establishing a DLM for a domain for implementing voice controls for a third party application, in accordance with some embodiments. Different embodiments of the process may include different and/or additional steps, or perform the steps in different orders. While this description ascribes the steps of the process to the various modules of the voice support server 108, steps of the process may be performed by other entities in other embodiments.

The voice support server 104 builds 405 a context embedding model. The context embedding model may be a neural network model trained using a corpus of language data (e.g., sentences) that converts received pieces of text into semantic representations (e.g., vectors). Each vector comprises one or more embeddings indicating semantic features of the corresponding text. Distances between different vectors corresponding to different pieces of text can be calculated, wherein the distance indicates a level of semantic similarity between the text.

The DLM generation module 202 of a domain 114 of the voice support server 108 receives 410 a plurality of intent patterns corresponding to a third party application. The intent patterns may be received from a developer of the third party application. Each intent pattern has an associated action that can be performed by the third party application, and may also indicate at least one entity or entity type that the action is related to. An intent pattern may comprise one or more variations, which correspond to different types of vocabulary that a user of the third party application may use to communicate their intent.

The DLM generation module 202 expands 415 the received intent patterns to form a DLM. In some embodiments, each of the intent patterns is expanded such that each of the defined variations within the pattern corresponds to a different expanded pattern. In addition, the DLM generation module 202 may, for an entity type defined in an intent pattern, access a server of the third party application to retrieve a listing of available entities for the entity type. The intent pattern is expanded using the listing of available entities, such that each expanded pattern corresponds to a particular entity of the listing of available entities. For example, if the intent pattern corresponds to an action to be performed on a file maintained by the third party application, the DLM generation module 202 may retrieve from the third party application a list of files that the action can be performed on, and expand the intent pattern using the received list (e.g., such that each file on the list will correspond to at least one expanded pattern). A particular intent pattern may thus be expanded into a set of expanded patterns that reflect different combinations of variations and entities of the listing of available entities. The DLM may comprise a collection of all expanded patterns corresponding to the intent patterns for a particular third party application.

The DLM generation module 202 further transmits 420 the expanded intent patterns of the DLM to the trained context embedding model, which generates intent vectors corresponding to each expanded intent pattern.

The clustering module 204 receives 425 the generated intent vectors, and clusters the vectors into a plurality of clusters (e.g., using K-means clustering). As discussed above, by clustering the intent vectors, vectors corresponding to received user utterances can be more efficiently matched to a closest intent vector.

Figure 5:
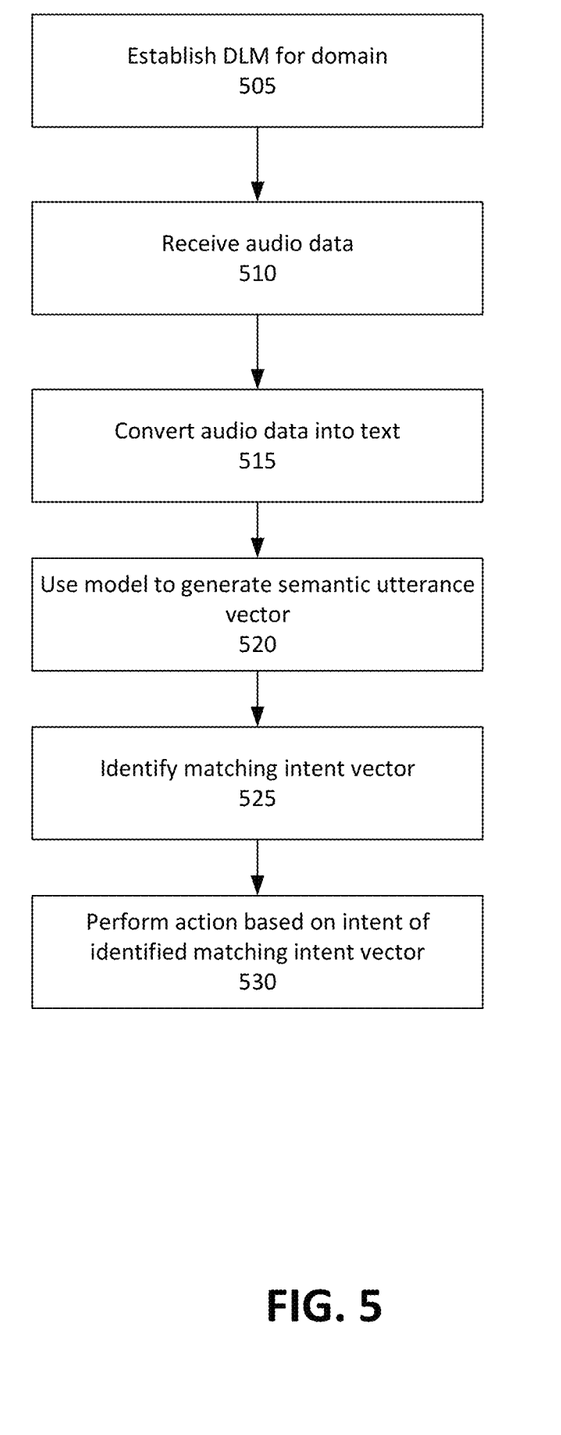
FIG. 5 is a flowchart of a process for processing received voice commands for controlling a third party application, in accordance with some embodiments.

FIG. 5 is a flowchart of a process for processing received voice commands for controlling a third party application, in accordance with some embodiments. The voice support server 108 establishes 505 a domain corresponding to the particular third party application, the domain having a DLM that is specific to the third party application. In some embodiments, the domain is implemented as a virtual machine.

The domain for the third party application receives 510 audio data associated with a user of the third party application, which may correspond to one or more spoken statements.

The domain converts 515 the received audio data into corresponding text. In some embodiments, the audio data is segmented into one or more user utterances (e.g., based upon pauses in the audio data), each utterance corresponding to a sentence spoken by the user. The determined user utterances are processed by a speech recognition module 110 to produce at least one textual transcription for each utterance, where the text transcription describes the words in the utterances.

The domain uses 520 a context embedding model to generate 520 a semantic utterance vector corresponding to a textual transcript of a user utterance. The domain compares the utterance vector to a plurality of intent vectors in the DLM for the domain and identifies 525 at least one matching intent vector. In some embodiments, the matching intent vector is the one that is closest (i.e., most similar) to the utterance vector. In some embodiments, the domain, for a particular utterance vector, first identifies a cluster of intent vectors that is closest to the utterance vector (e.g., based upon a centroid of the cluster). The domain then identifies a particular intent vector of the identified cluster as closest to the utterance vector. In some embodiments, identifying a closest cluster may be performed using a first type of vector, while identifying a closest intent vector of the cluster may be performed using a second type of vector that is more precise than the first type of vector. In some embodiments, the domain 520 determines a context associated with the semantic utterance vector (e.g., based upon metadata received in conjunction with the audio data), and limits the corpus of intent vectors in the DLM that the utterance vector is compared against based upon the determined context.

The domain causes 530 the third party application to perform an action associated with the intent corresponding to the identified intent vector. For example, the domain may transmit instructions to the voice response module 112 associated with the third party application indicating the action to be performed and an entity the action is to be performed on. In addition, in some embodiments, the instructions may comprise an indication of the text of the user utterance, allowing for the third party application to display text to the user that reflects the text used by the user when controlling the third party application. If the domain does not identify an intent vector as matching the utterance vector, the domain may cause the third party application to display an error message indicating that no match was found, ignore the received audio data without performing another action, and/or perform another action.

As such, a voice support server is able to provide voice control functionality to a third party application that does not natively support voice control. By installing a voice control module (e.g., as a plug-in) on the third party application, audio data can be collected and analyzed to determine an intent of the user, whereupon the third party application can be instructed to perform an action corresponding to the determined intent.

Because the voice support server implements a separate domain customized for each third party application, user utterances from received audio data are compared to a limited language set reflecting intents corresponding to specific actions performable by the third party application, and not to a general body of language, allowing for improved recognition of user commands. For example, a user utterance may be more easily matched to a particular intent pattern (such as "play $song") since the universe of possible intents/actions (e.g., "play") is constrained to those actually supported by the domain of the third party application, and the universe of possible entities (e.g., $song) is restricted to entities accessible by the third party of application. As such, intent matching can be performed even if the user is not able to articulate an intent with perfect clarity (e.g., due to an accent, speech impediment, etc.). In addition, in some embodiments, a current context of the application may be used to further narrow the universe of possible intents and entities that can be matched to, potentially further improving match accuracy.

Other Embodiments

Figure 6:
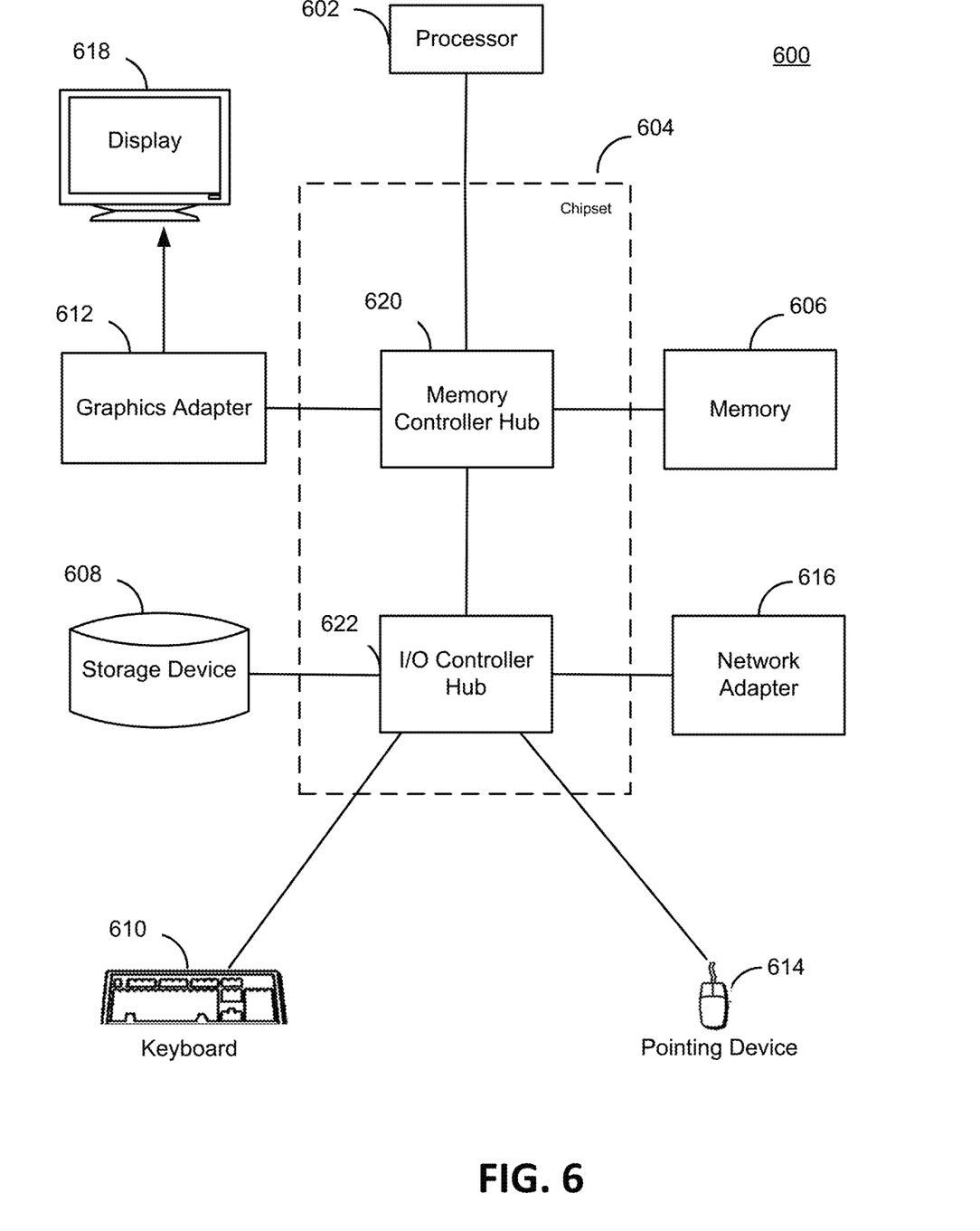
FIG. 6 is a high-level block diagram of a computer system that may be used to implement one or more portions of the voice support server, in accordance with some embodiments.

The entities shown in preceding figures are implemented using one or more computers. FIG. 6 is a high-level block diagram of a computer system that may be used to implement one or more portions of the voice support server 108, in accordance with some embodiments. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network (not shown).

As is known in the art, a computer system 600 can have different and/or other components than those shown in FIG. 6. In addition, the computer system 600 can lack certain illustrated components. For example, the computer acting as the voice support server 108 can be formed of multiple blade servers linked together into one or more distributed systems and lack components such as keyboards and displays. Moreover, the storage device 608 can be local and/or remote from the computer system 600 (such as embodied within a storage area network (SAN)).

As is known in the art, the computer system 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method of providing voice control for an application, the method comprising:
   receiving, via a wireless network, audio data associated with a user of an application executing on a remote client device;
   converting the received audio data into corresponding text;
   generating an utterance vector indicating semantic features of the corresponding text;
   generating a domain language model specific to the application by:
   receiving a plurality of intent patterns having associated actions performable by the application, wherein an intent pattern of the plurality of intent patterns references an entity type corresponding to a plurality of entities accessible by the application;
   expanding the plurality of intent patterns based on the plurality of entities accessible by the application to generate a plurality of expanded intent patterns; and
   generating a plurality of intent vectors based on the plurality of expanded intent patterns;
   comparing the utterance vector to the plurality of intent vectors of the domain language model to identify an intent vector matching the utterance vector; and
   transmitting instructions to the remote client device via the wireless network to cause the application to perform an action associated with the identified matching intent vector.

2. The method of claim 1,
   wherein generating the plurality of intent vectors based on plurality of expanded intent patterns uses a semantic embeddings model.

3. The method of claim 1, wherein expanding the plurality of intent patterns to generate the plurality of expanded intent patterns comprises:
   retrieving a listing of a plurality of named entities having the entity type; and
   expanding the intent pattern into a plurality of expanded intent patterns by creating at least one expanded intent pattern for each of the plurality of named entities.

4. The method of claim 1, wherein receiving the audio data associated with the user of the application comprises:
   receiving audio data captured by a voice support module executing on the remote client device and distinct from the application.

5. The method of claim 1, wherein generating the utterance vector indicating semantic features of the corresponding text comprises:
applying the corresponding text to a context embedding model, the context embedding model converting the corresponding text into an utterance vector representing semantic meaning of the corresponding text.

6. A method of providing voice control for an application, the method comprising:
receiving, via a wireless network, audio data associated with a user of an application executing on a remote client device;
converting the received audio data into corresponding text;
generating an utterance vector indicating semantic features of the corresponding text comprising generating a first utterance vector and a second utterance vector that is more precise than the first utterance vector;
comparing the first utterance vector and the second utterance vector to a plurality of intent vectors to identify an intent vector matching the utterance vector, the comparing comprising:
identifying a matching cluster of a plurality of clusters of intent vectors matching the first utterance vector; and
identifying an intent vector within the matching cluster that matches the second utterance vector; and
transmitting instructions to the remote client device via the wireless network to cause the application to perform an action associated with the identified matching intent vector.

7. A method of providing voice control for an application, the method comprising:
receiving, via a wireless network, audio data associated with a user of an application executing on a remote client device;
converting the received audio data into corresponding text;
generating an utterance vector indicating semantic features of the corresponding text;
comparing the utterance vector to a plurality of intent vectors of a domain language model specific to the application to identify an intent vector matching the utterance vector, the comparing comprising:
determining a context of the application associated with the received audio data;
identifying a subset of the domain language model associated with the context of the application; and
comparing the utterance vector to a plurality of intent vectors within the identified subset of the domain language model; and
transmitting instructions to the remote client device via the wireless network to cause the application to perform an action associated with the identified matching intent vector.

8. The method of claim 1, wherein transmitting instructions to the remote client device comprises:
transmitting the instructions to a voice support module executing on the remote client device and distinct from the application, the voice support module adapted to interface with the application to perform the action associated with the identified matching intent vector.

9. A non-transitory computer-readable storage medium storing computer program instructions executable by a processor to perform operations for providing voice control for an application, the operations comprising:
receiving, via a wireless network, audio data associated with a user of an application executing on a remote client device;
converting the received audio data into corresponding text;
generating an utterance vector indicating semantic features of the corresponding text;
generating a domain language model specific to the application by:
receiving a plurality of intent patterns having associated actions performable by the application, wherein an intent pattern of the plurality of intent patterns references an entity type corresponding to a plurality of entities accessible by the application;
expanding the plurality of intent patterns based on the plurality of entities accessible by the application to generate a plurality of expanded intent patterns; and
generating a plurality of intent vectors based on the plurality of expanded intent patterns;
comparing the utterance vector to the plurality of intent vectors of the domain language model to identify an intent vector matching the utterance vector; and
transmitting instructions to the remote client device via the wireless network to cause the application to perform an action associated with the identified matching intent vector.

10. The non-transitory computer-readable storage medium of claim 9,
wherein generating the plurality of intent vectors based on plurality of expanded intent patterns uses a semantic embeddings model.

11. The non-transitory computer-readable storage medium of claim 9, wherein expanding the plurality of intent patterns to generate the plurality of expanded intent patterns comprises:
retrieving a listing of a plurality of named entities having the entity type; and
expanding the intent pattern into a plurality of expanded intent patterns by creating at least one expanded intent pattern for each of the plurality of named entities.

12. The non-transitory computer-readable storage medium of claim 9, wherein receiving the audio data associated with the user of the application comprises:
receiving audio data captured by a voice support module executing on the remote client device and distinct from the application.

13. The non-transitory computer-readable storage medium of claim 9, wherein generating the utterance vector indicating semantic features of the corresponding text comprises:
applying the corresponding text to a context embedding model, the context embedding model converting the corresponding text into an utterance vector representing semantic meaning of the corresponding text.

14. A non-transitory computer-readable storage medium storing computer program instructions executable by a processor to perform operations for providing voice control for an application, the operations comprising:
receiving, via a wireless network, audio data associated with a user of an application executing on a remote client device;
converting the received audio data into corresponding text;
generating an utterance vector indicating semantic features of the corresponding text, comprising generating a first utterance vector and a second utterance vector that is more precise than the first utterance vector;

comparing the first utterance vector and the second utterance vector to a plurality of intent vectors of to identify an intent vector matching the utterance vector, the comparing comprising:
    identifying a matching cluster of a plurality of clusters of intent vectors matching the first utterance vector; and
    identifying an intent vector within the matching cluster that matches the second utterance vector; and
transmitting instructions to the remote client device via the wireless network to cause the application to perform an action associated with the identified matching intent vector.

15. A non-transitory computer-readable storage medium storing computer program instructions executable by a processor to perform operations for providing voice control for an application, the operations comprising:
    receiving, via a wireless network, audio data associated with a user of an application executing on a remote client device;
    converting the received audio data into corresponding text;
    generating an utterance vector indicating semantic features of the corresponding text;
    comparing the utterance vector to a plurality of intent vectors of a domain language model specific to the application to identify an intent vector matching the utterance vector, the comparing comprising:
        determining a context of the application associated with the received audio data;
        identifying a subset of the domain language model associated with the context of the application; and
        comparing the utterance vector to a plurality of intent vectors within the identified subset of the domain language model; and
    transmitting instructions to the remote client device via the wireless network to cause the application to perform an action associated with the identified matching intent vector.

16. The non-transitory computer-readable storage medium of claim 9, wherein transmitting instructions to the remote client device comprises:
    transmitting the instructions to a voice support module executing on the remote client device and distinct from the application, the voice support module adapted to interface with the application to perform the action associated with the identified matching intent vector.

17. A voice support server for providing voice control for an application, the voice support server comprising:
    a receiver configured to receive, via a wireless network, audio data associated with a user of an application executing on a remote client device;
    an audio processing module configured to:
        convert the received audio data into corresponding text; and
        generate an utterance vector indicating semantic features of the corresponding text;
    a domain language model generation module configured to generate a domain language model specific to the application by:
        receiving a plurality of intent patterns having associated actions performable by the application, wherein an intent pattern of the plurality of intent patterns references an entity type corresponding to a plurality of entities accessible by the application;
        expanding the plurality of intent patterns based on the plurality of entities accessible by the application to generate a plurality of expanded intent patterns; and
        generating a plurality of intent vectors based on the plurality of expanded intent patterns; and
    an intent matching module configured to:
        compare the utterance vector to a plurality of intent vectors of the domain language model to identify an intent vector matching the utterance vector; and
        transmit instructions to the remote client device via the wireless network to cause the application to perform an action associated with the identified matching intent vector.

18. The voice support server of claim 17, wherein generating the plurality of intent vectors based on plurality of expanded intent patterns uses a semantic embeddings model.

19. The voice support server of claim 17, wherein expanding the plurality of intent patterns to generate the plurality of expanded intent patterns comprises:
    retrieving a listing of a plurality of named entities having the entity type; and
    expanding the intent pattern into a plurality of expanded intent patterns by creating at least one expanded intent pattern for each of the plurality of named entities.

20. A voice support server for providing voice control for an application, the voice support server comprising:
    a receiver configured to receive, via a wireless network, audio data associated with a user of an application executing on a remote client device;
    an audio processing module configured to:
        convert the received audio data into corresponding text; and
        generate an utterance vector indicating semantic features of the corresponding text; and
    an intent matching module configured to:
        compare the utterance vector to a plurality of intent vectors of a domain language model specific to the application to identify an intent vector matching the utterance vector, the comparing comprising:
            determining a context of the application associated with the received audio data;
            identifying a subset of the domain language model associated with the context of the application; and
            comparing the utterance vector to a plurality of intent vectors within the identified subset of the domain language model; and
        transmit instructions to the remote client device via the wireless network to cause the application to perform an action associated with the identified matching intent vector.

* * * * *